United States Patent
Koch et al.

(10) Patent No.: US 11,743,070 B2
(45) Date of Patent: Aug. 29, 2023

(54) VARIABLE INFORMATION COMMUNICATION

(71) Applicant: AT&T Intellectual Property I, L.P., Atlanta, GA (US)

(72) Inventors: Robert Koch, Peachtree Corners, GA (US); Nikhil Marathe, Palatine, IL (US); James Pratt, Round Rock, TX (US); Ari Craine, Marietta, GA (US); Eric Zavesky, Austin, TX (US); Timothy Innes, Atlanta, GA (US); Nigel Bradley, Canton, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 406 days.

(21) Appl. No.: 16/710,638

(22) Filed: Dec. 11, 2019

(65) Prior Publication Data

US 2021/0184882 A1 Jun. 17, 2021

(51) Int. Cl.
*H04L 12/28* (2006.01)
*G05B 15/02* (2006.01)
(Continued)

(52) U.S. Cl.
CPC .......... *H04L 12/2818* (2013.01); *G05B 15/02* (2013.01); *G06V 20/20* (2022.01);
(Continued)

(58) Field of Classification Search
CPC . H04L 12/2818; H04L 9/3213; H04L 12/282; H04L 12/2829; G05B 15/02;
(Continued)

(56) References Cited

U.S. PATENT DOCUMENTS 7,124,087 B1  10/2006  Rodriguez et al.
7,627,098 B2  12/2009  Baik et al.
(Continued)

FOREIGN PATENT DOCUMENTS

EP  1185028 A1  3/2002

OTHER PUBLICATIONS

Pavithra et al.; "IoT based Monitoring and Control System for Home Automation"; IEEE Global Conf. on Communication Technologies; 2015; p. 169-173.
(Continued)

*Primary Examiner* — Asghar H Bilgrami
(74) *Attorney, Agent, or Firm* — Guntin & Gust, PLC; Matthew Tropper (57) ABSTRACT

A method, system, computer readable storage medium, or apparatus provides for obtaining first information of a user (e.g., a user profile), wherein the user may be associated with a mobile device; based on the first information of the user, determining whether to communicate with the user via local area communication or wide area communication (e.g., a communication context) during a first period; determining to communicate via wide area communication during the first period; based on the determining to communicate via the wide area communication during the first period, sending an alert to invite the user associated with the mobile device to communicate with a remote domain (e.g., a remote physical location, such as a home, business, park, etc.); and based on acceptance of the invite, assigning a token for the user associated with the mobile device to further communicate with the remote domain.

20 Claims, 4 Drawing Sheets

(51) Int. Cl.
*G06V 20/20* (2022.01)
*H04L 9/32* (2006.01)
*H04W 4/02* (2018.01)
*H04W 64/00* (2009.01)

(52) U.S. Cl.
CPC .......... *H04L 9/3213* (2013.01); *H04L 12/282* (2013.01); *H04L 12/2829* (2013.01); *H04W 4/023* (2013.01); *H04W 64/003* (2013.01); *G05B 2219/2642* (2013.01)

(58) Field of Classification Search
CPC .......... G05B 2219/2642; G06V 20/20; H04W 4/023; H04W 64/003
See application file for complete search history.

(56) References Cited

U.S. PATENT DOCUMENTS

| | | | |
|---|---|---|---|
| 9,490,996 | B1 | 11/2016 | Vijayrao et al. |
| 9,559,861 | B2 * | 1/2017 | Grasso ................ H04L 12/2809 |
| 9,948,685 | B2 | 4/2018 | Na et al. |
| 10,073,428 | B2 | 9/2018 | Bruhn et al. |
| 10,091,017 | B2 | 10/2018 | Landow et al. |
| 10,181,988 | B1 * | 1/2019 | Farah ..................... H04L 41/06 |
| 10,185,934 | B2 | 1/2019 | Gupta |
| 10,234,162 | B2 | 3/2019 | Lu et al. |
| 10,325,329 | B2 | 6/2019 | Tatourian et al. |
| 10,425,392 | B2 * | 9/2019 | Tal ......................... G06Q 50/01 |
| 10,541,958 | B2 * | 1/2020 | Tal ......................... G06Q 50/01 |
| 11,082,249 | B2 * | 8/2021 | Wang ..................... H04L 12/282 |
| 11,109,471 | B1 * | 8/2021 | Recker ................. H05B 47/115 |
| 11,140,157 | B1 * | 10/2021 | Xia ....................... H04L 63/0853 |
| 2004/0210647 | A1 | 10/2004 | Jin et al. |
| 2005/0198199 | A1 * | 9/2005 | Dowling ............... G06Q 20/04 709/217 |
| 2009/0139121 | A1 | 6/2009 | Bury |
| 2010/0298957 | A1 | 11/2010 | Sanchez Rocha et al. |
| 2014/0280865 | A1 * | 9/2014 | Albertson ............. H04W 4/023 709/224 |
| 2015/0006870 | A1 * | 1/2015 | Switzer ..................... G06F 8/65 713/1 |
| 2015/0039105 | A1 | 2/2015 | Lee |
| 2015/0052080 | A1 | 2/2015 | Letzeiser |
| 2015/0084750 | A1 * | 3/2015 | Fitzgibbon ............. G08C 17/02 340/12.29 |
| 2015/0141076 | A1 * | 5/2015 | Libin ...................... H04W 4/60 455/557 |
| 2015/0205316 | A1 | 7/2015 | Choi et al. |
| 2016/0203700 | A1 | 7/2016 | Bruhn et al. |
| 2016/0284206 | A1 * | 9/2016 | Boettcher .............. C12N 15/85 |
| 2016/0330825 | A1 * | 11/2016 | Recker ................. H05B 47/115 |
| 2017/0026157 | A1 | 1/2017 | Bugenhagen et al. |
| 2017/0041271 | A1 * | 2/2017 | Tal .......................... G06Q 10/10 |
| 2017/0093594 | A1 | 3/2017 | Peak |
| 2017/0245344 | A1 * | 8/2017 | Child ..................... H05B 31/50 |
| 2017/0337805 | A1 * | 11/2017 | Eyring ............... G08B 13/1968 |
| 2017/0345420 | A1 | 11/2017 | Barnett, Jr. |
| 2018/0295187 | A1 | 10/2018 | Sabata et al. |
| 2019/0087646 | A1 | 3/2019 | Goulden et al. |
| 2019/0208421 | A1 * | 7/2019 | Ziraknejad ............ H04L 63/083 |
| 2019/0267004 | A1 | 8/2019 | Lee et al. |

OTHER PUBLICATIONS

Jie et al.; "Smart Home System based on IOT Technologies"; IEEE Int'l Conf. on Computational and Information Sciences; 2013; p. 1789-1791.

Kelly et al.; "Towards the Implementation of IoT for Environmental Condition Monitoring in Homes"; IEEE Sensors Journal; vol. 13; Oct. 2013; p. 3846-3853.

Xu et al.; "Toward Software Defined Smart Home"; IEEE Communications Magazine; May 2016; p. 116-122.

Wang et al.; "An IoT-based Appliance Control System for Smart Homes"; Fourth Int'l Conf. on Intelligent Control and Information Processing; Jun. 2013; p. 744-747.

* cited by examiner

VARIABLE INFORMATION COMMUNICATION

BACKGROUND

In a world of ever increasing smart devices and smarter technologies, the internet of things (IoT) proposes that everyday objects and devices (e.g., light bulbs, washing machines and cameras) are to have an internet connection, where these objects are enabled to send or receive data to and from other devices, thus forming a larger network of connected things (e.g., objects or devices). The IoT promises smarter homes and work environments where all the objects are seamlessly connected and controlled for easier and more convenient operation.

This disclosure is directed to addressing issues in the existing technology. This background information is provided to reveal information believed by the applicant to be of possible relevance. No admission is necessarily intended, nor should be construed, that any of the preceding information constitutes prior art.

SUMMARY

Disclosed herein are methods, systems, and apparatuses for providing variable means, context, and other factors for communication of information which may be between domains and mobile devices over a network. An exemplary environment is described using a house that is for sale as the domain. An associated server of the domain may initiate the communication and the communication may vary in modes used, information conveyed, context, and other factors based on a number of criteria.

In an example, an apparatus may include a processor and a memory coupled with the processor that effectuates operations. The operations may include obtaining first information of a user (e.g., a user profile), wherein the user may be associated with a mobile device; based on the first information of the user, determining whether to communicate with the user via local area communication or wide area communication (e.g., a communication context) during a first period; determining to communicate via wide area communication during the first period; based on the determining to communicate via the wide area communication during the first period, sending an alert to invite the user associated with the mobile device to communicate with a remote domain (e.g., a remote physical location, such as a home, business, park, etc.); and based on acceptance of the invite, assigning a token for the user associated with the mobile device to further communicate with the remote domain. In addition, the operations may include obtaining an indication that the user associated with the mobile device is in proximity of the domain; and based on the user associated with the mobile device being in proximity of the domain, changing the communication with the user associated with the mobile device from the wide area communication to the local area communication. The local area communication may integrate local devices of the domain or augmented reality to communicate second information. The domain may be a house, business, or other objects.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Disclosed herein are methods, systems, and apparatuses for providing variable means, context, and other factors for communication of information which may be between domains (e.g., home, room, lamp, chair, etc.) and a mobile device over a network. An exemplary environment is described using a house that is for sale as the domain. An associated server of the domain may initiate the communication and the communication may vary in modes used, information conveyed, context, and other factors based on a number of criteria.

Figure 1:
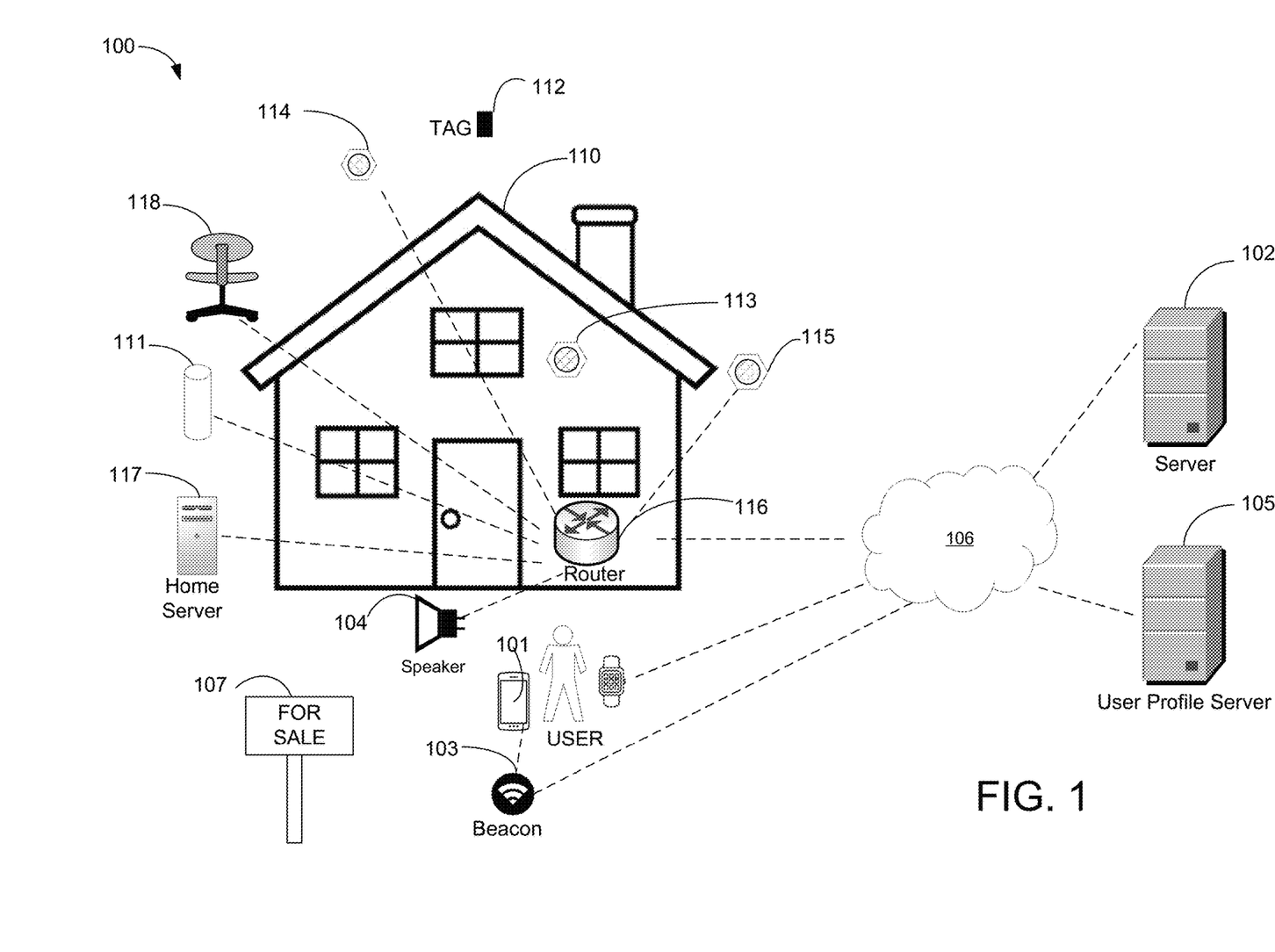
FIG. 1 illustrates an exemplary system associated with variable information communication.

FIG. 1 illustrates an exemplary system associated with variable information communication. System 100 may include multiple devices that may be outside of home 110 (e.g., a house), such as mobile device 101, beacon 103, speaker 104, server 102, or user profile server 105, among other things. System 100 may include multiple devices that may be inside of home 110, such as home server 117, virtual assistant 111, camera 113, exterior sensor 114, interior sensor 115, router 116, or speaker 104, among other things. It is contemplated that devices listed may be inside or outside of home 110 in certain situations. Home 110, which may be considered a domain, may include objects that are primarily not electronic, such as chair 118, or other furniture. Domain may be narrowed to home-office, home-office-chair, or the like. The devices or objects may include one or more tags, such as tag 112 may be integrated or otherwise attached to the devices or objects of system 100. As disclosed in more detail herein, tag 112 may assist in implementation of variable information communication. The devices or objects of system 100 may be communicatively connected with each other (e.g., via wireless or wired connections using network 106 or peer-to-peer (P2P) communication).

With continued reference to FIG. 1, in an example, server 102, user profile server 105, or home server 117 may be communicatively connected with each other in order to obtain or provide information associated with a user, such as the user of mobile device 101. Server 102 may obtain information from any of the devices of system 100, which may be associated with home 110 or user of mobile device 101 (e.g., user profile information), to help manage the communication between home 110, mobile device 101, and the user of mobile device 101. User profile server 105 may include a plurality of user profiles. The user profiles may be accessed for a plurality of different domains. For example, servers associated with different domains may access user profile server 105 in order to provide individualized communication to the user of mobile device 101. Home server 117 may be a server local to home 110 that gathers information about the objects in home 110 and, based on location for example, may also effectuate some of the operations that are usually considered to be operations of server 102 or user profile server 105. It is contemplated herein that the functions of the devices of system 100 may be combined into one device or distributed over multiple devices.

Mobile device 101 may include, wireless devices, such as satellite communication systems, portable digital assistants (PDAs), laptop computers, tablet devices, smart phones, smart watches, smart speakers, automobiles (e.g., autonomous vehicles), augmented reality devices, virtual reality devices, virtual assistants, or the like. Exterior sensor 114 or interior sensor 115 may include an environmental sensor, acoustic sensor, sound sensor, vibration sensor, fluid sensor, optical sensor, position sensor (e.g., accelerometer or gyroscope), speed sensor, chemical sensor, pressure sensor, camera, or the like.

Figure 2:
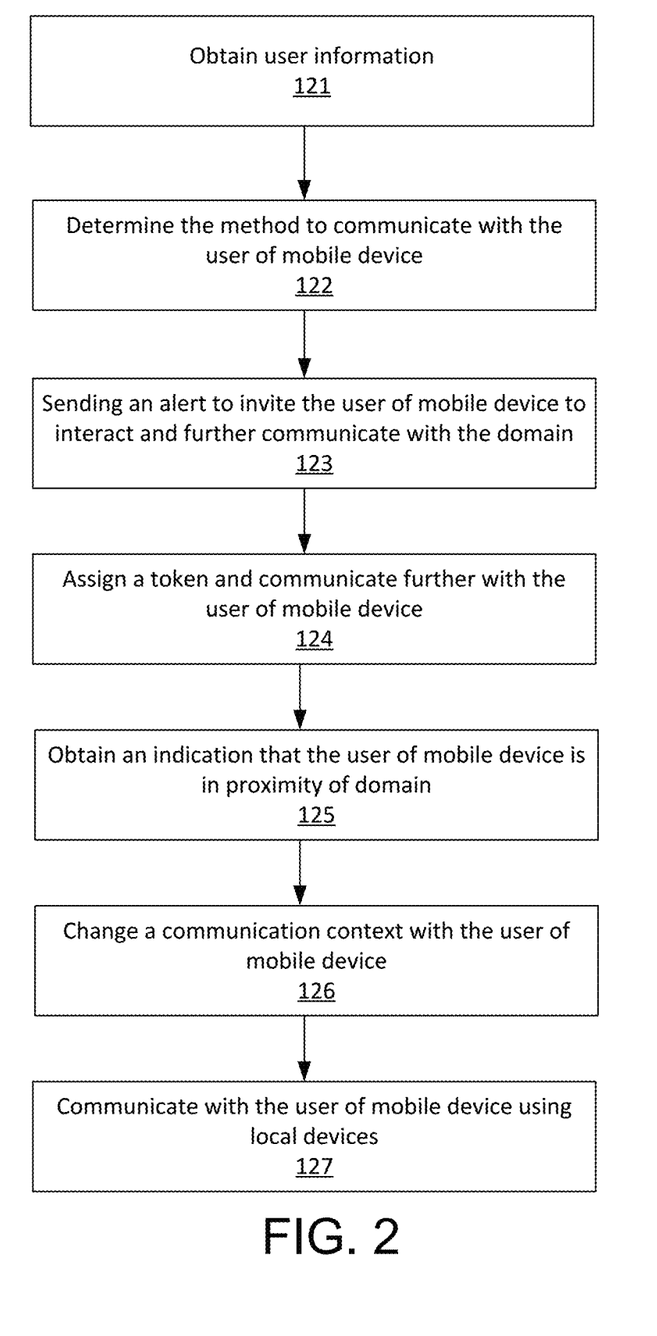
FIG. 2 illustrates an exemplary method associated with variable information communication.

FIG. 2 illustrates an exemplary method associated with variable information communication. At step 121, home server 117 may obtain user information. This user information may be contact information for the user of mobile device 101, such as an e-mail address, a phone number, a home address, a social media address, or the like. The user profile server 105 may provide user information to home server 117, in which the user information may also include user mobile device usage information, location information, demographic information, preferences (e.g., décor preferences), or the like. A trigger for home server 117 to obtain the contact information for the user of mobile device 101 may be based on user information of the user profile matching one or more parameters. In a scenario where home 110 is for sale, the parameters may include a threshold gross income of a user, a threshold location of a user, a threshold credit score of a user, a threshold family size of a user, a threshold family make-up of a user (e.g., number or age of kids), or the like.

At step 122, based on the user information of step 121, home server 117 may determine the method for home server 117 to communicate with the user of mobile device 101. For example, the methods of communication for home server 101 may include wide area modes of communication, such as a wireless or wired wide area network (WAN), virtual reality displaying the interior or exterior of home 110, e-mails, or SMS texts, among other things. In another example, methods of communication for home server 101 may include local area modes of communication, such as a wireless (e.g., Bluetooth or Wi-Fi) or wired local area network (LAN) network, peer-to-peer communication, local displays (e.g., displaying text or video a TV or computer display) of home 110, speakers of home 110 (e.g., smart speakers), mobile device 101 (e.g., augmented reality or audio-visual when located at home 110), or lighting (e.g., red for stop or green for go to enter certain areas of the home) of home 110, among other things.

At step 123, based on the determination of the communication method, which is a display on mobile device 101 via an app using the WAN for this exemplary scenario, sending an alert to invite the user of mobile device 101 to interact and further communicate with the domain of home 110. The invitation may be sent or have a requested communication date or time based on the user profile (e.g., availability based on an electronic calendar associated with the user of mobile device 101). The alert may include photos, videos, or text associated with home 110. In an example, the alert may include information such as a description of home 110, asking price of home 110, address of home 110, or the like. Based on the user profile, home server 117 may personalize the invitation for the user of mobile device 101 to communicate with the domain of home 110. For example, if the user of mobile device 101 has two teens, the alert may be customized to communicate "My two basement bedrooms might provide a great private space for your teens." At step 124, based on acceptance of the invite of step 123, home server 117 may assign a token and communicate further with the user of mobile device 101. Home 117 may assign the token to mobile device 101 for a period, while mobile device 101 is communicating to the domain of home 110 via wide area communication. Home server 117 may provide an invitation to the user of mobile device 101 to see home 110 and provide an address and directions to home 110.

At step 125, home server 117 may obtain an indication that the user of mobile device 101 is in proximity of home 110 (e.g., within 100 feet or within the property boundary). In an example, as the user and mobile device 101 approaches home 110 a beacon, such as a Bluetooth beacon, may detect that mobile device 101 and the user is nearby. In another example, a camera with facial recognition functions may detect the user of mobile device 101. In another example, GPS coordinates may be provided to home server 117 and provide the location of mobile device 101.

At step 126, based on the proximity indication of step 125, there may be a change in communication context with the user of mobile device 101 that integrates local devices or augmented reality to communicate information. When the user of mobile device 101 is in proximity, home server 117 may request the token. The token may be automatically communicated to home server 117 via mobile device 101 or the user may enter the token (e.g., alpha-numeric password) into a device that is located at home 110. When the token is obtained by home server 117 and authorized, home server 117 may switch to local area communication. In an example, based on the beacon, home server 117 may switch the communication mode from the WAN to a Bluetooth personal area network (PAN) or LAN (e.g., Wi-Fi). Since the user of mobile device 101 is physically at home 110 there may be a switch from what may be considered wide area communication to local area communication. It is contemplated that what is considered as wide area communication and local area communication may overlap. The house may present information using data from data it has gathered over months or years via sensors, public databases, or the like. Home server 117 may use a speaker installed in home 110 (e.g., installed at For Sale sign 107) to communicate "As you can now see, the driveway was recently replaced." By using a LAN or PAN now for this communication, the sharing of information may be more secure since it is not shared over the WAN. Further, based on the proximity indication of step 125, physical access or networked access to mobile device 101 may be allowed for the domain of home 110. For example, doors to rooms may be locked or unlocked, access may be given to open or close a garage door, or appliances may be available through the network access, among other things.

At step 127, home server 117 may communicate with the user of mobile device 101 using local devices. The communication may be based on the user profile or observed behavior of the user of mobile device 101 with home 110. In an example, using a smart speaker, the user may communicate that the user would like to obtain a log of exterior repairs that occurred to home 110. Based on that request, home server 117 may communicate that there was roof repair done on September $12^{th}$ and driveway repair done on July $6^{th}$. Home server 110 may adjust lights (e.g., user's preferred lighting and color), temperature (air conditioning or heat), videos, or music, among other things, which may be based on the user profile. In an example, home server 117 may prepare home 110 by implementing a "viewing" profile that is customized for the user of mobile device 101 based on the user's profile, such that audio or lighting may be updated based on movement or profile information of the user of mobile device 101. The user of mobile device 101 may be tracked through home 110 based on a sensor of home 110. The sensor may be a camera (e.g., camera 113) that may be used to recognize the movements of the user.

With continued reference to step 127, the local area communication may be associated with augmented reality. For example, when the user of mobile device 101 is using wide area communication, mobile device 101 may show home 110 using virtual reality. When mobile device 101 reaches home 117, then the user may be able to use augmented reality that is viewed through mobile device 101 (e.g., a smart phone). The user may insert virtual furniture, flooring, appliances, or landscaping, among other things that may be overlaid on the environment shown at home 110.

As disclosed herein, home server 117 may access data about the user from the user profile server 105. This may be data that is certified by a third party to authenticate the user's identity, credit, reputation, and other factors needed to determine if the user may have entry to home 117. Parts of home 110 may also include electronic tags, such as Wi-Fi tags that may provide data to home server 117. For instance, when a new roof is installed, the installer may attach a Wi-Fi tag with data including date installed, type of shingle, color, or warranty expiration date, among other historical data of home 110. The user of mobile device 101 may ask questions associated with home 110 through a smart speaker or other device. For instance, the user may ask "how well has the HVAC system been maintained?" Home server 117 may access data in a server or may query the HVAC unit itself, which may provide a status of operational maintenance, efficiency, last service date, installation date, or other information to the user.

Below are additional scenarios associated with the variable information communication system. For example, the disclosed system may be used to adjust the environment prior to allowing the user entry to the home 110. This may be based on the user's profile data—e.g., play music that the user likes. It may also be non-user-specific (e.g., adjust the temperature to accommodate having a guest in home 110). Data from exterior sensor 114 or interior sensor 115 (e.g., exterior environmental sensors) may be used to provide a representation of "personality" of home 110 to present to the user. For example, based on data from exterior sensor 114 or interior sensor 115, home server 117 may convey that exterior noise level is typically 40 dB during the day/night, on average, 5 cars per hour drive by during the day, typical exterior light levels on each side of the house at night, etc. Home server 117 may adjust the environment to mimic the typical environment, by using speakers, automatic shutters, or interior and exterior lights, among other things.

In another scenario, home server 117 may be supplemented by external data sources as needed. For instance, if the user asks virtual assistant 111 of home 110 about the community, home 110 may access sources over the Internet to collect information on crime statistics, or other demographic information for the area and then relay that information to the user via local devices.

Again, it is contemplated that the disclosed subject matter may be applicable to scenarios other than real estate sales, as introduced herein. In another scenario the domain may be a business office-phone of the user. Parameters may include the phone number of the inbound caller, the location of the user of the mobile device 101, availability of the user based on entries in an electronic calendar of the user, or the like. When the parameters match user information (which may be from the user profile), determinations may be made on whether to ring the mobile phone, tablet, or office landline or whether to send to voicemail and transcript to e-mail or SMS text to send to the mobile device 101 of the user In other scenarios, the domain may be associated with businesses looking for employees, the sale or lease of products (e.g., cars or appliances), or the sale or lease of real estate, among other things.

In each of these scenarios, the parameters may be associated with areas of interest for the domain, such as desired salary, work experience, volunteer experience, gross income, or current residence, among other things. The disclosed subject matter allows a consumer to visit home 110 without having a real estate agent on premise and may validate the trustworthiness of the user through credit reputation or other scores, which may be accessed through the user profile.

Figure 3:
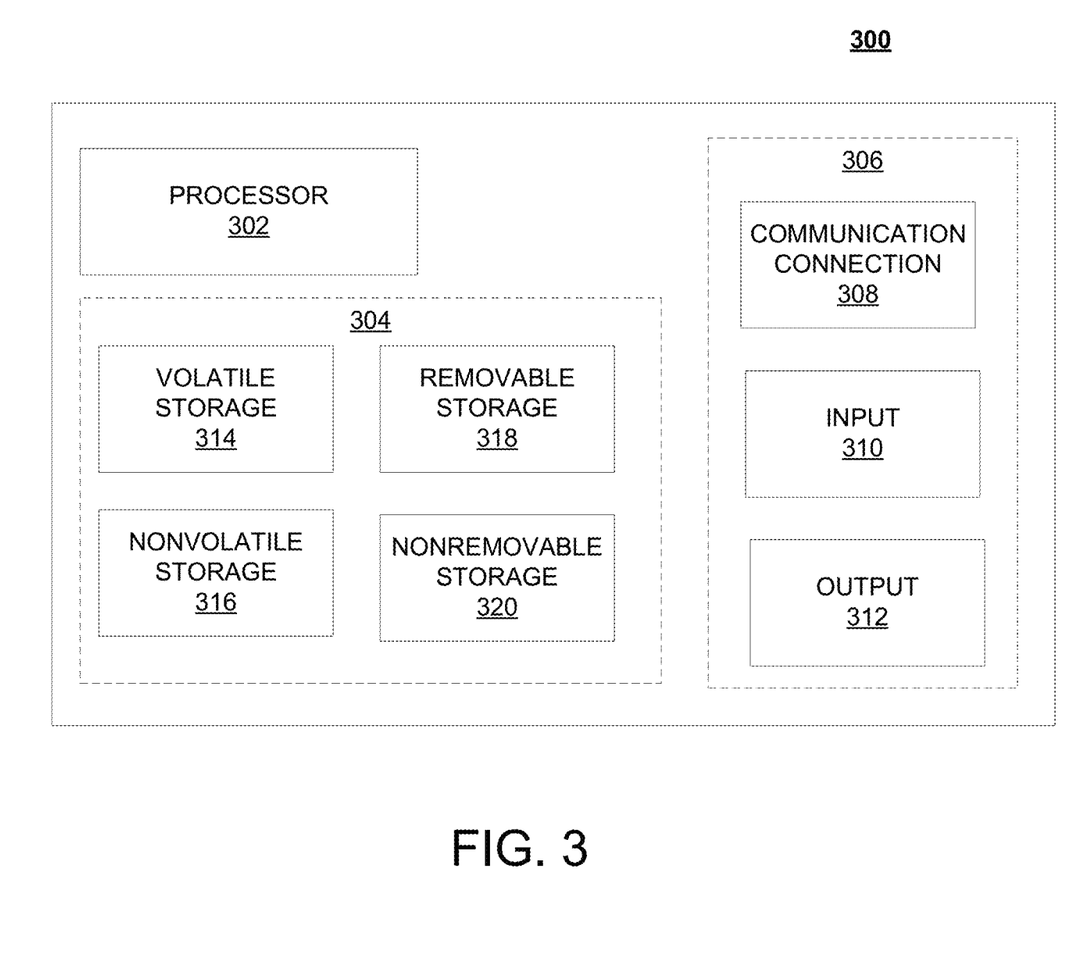
FIG. 3 illustrates a schematic of an exemplary network device.

FIG. 3 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
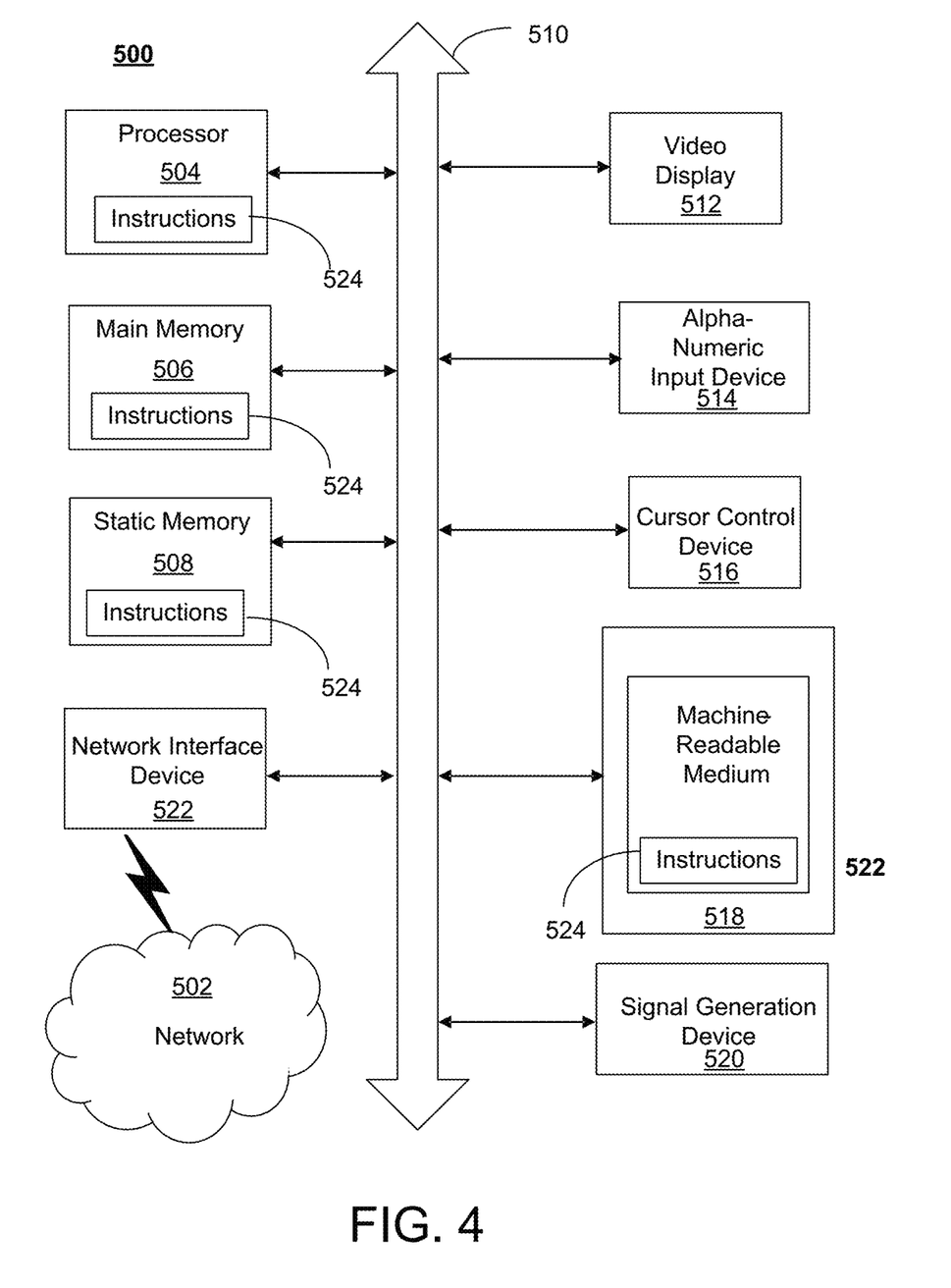
FIG. 4 illustrates an exemplary communication system that provides wireless telecommunication services over wireless communication networks.

FIG. 4 depicts an exemplary diagrammatic representation of a machine in the form of a computer system 500 within which a set of instructions, when executed, may cause the machine to perform any one or more of the methods described above. One or more instances of the machine can operate, for example, as processor 302, mobile device 101, beacon 103, speaker 104, server 102, user profile server 105, other devices of FIG. 1. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system wherein management and control utilizing a software defined network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which variable information communication can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While a system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a system as described herein should not be limited to any single example, but rather should be construed in breadth and scope in accordance with the appended claims.

In describing preferred methods, systems, or apparatuses of the subject matter of the present disclosure—variable information communication—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for variable information communication. A method, system, computer readable storage medium, or apparatus provides for obtaining first information of a user (e.g., a user profile), wherein the user may be associated with a mobile device; based on the first information of the user, determining whether to communicate with the user via local area communication or wide area communication (e.g., a communication context) during a first period; determining to communicate via wide area communication during the first period; based on the determining to communicate via the wide area communication during the first period, sending an alert to invite the user associated with the mobile device to communicate with a remote domain (e.g., a remote physical location, such as a home, business, park, etc.); and based on acceptance of the invite, assigning a token for the user associated with the mobile device to further communicate with the remote domain. Note the remote domain server (e.g., the apparatus) may be located in the cloud or at the physical location or a combination. In an example, a virtual machine of home server 117, which is for the domain of home 110, may be located in the cloud (e.g., network 106 or server 102), then relocated to home 110, based on proximity or parameters (e.g., factors), as disclosed herein. The method, system, computer readable storage medium, or apparatus may provide for obtaining an indication that the user associated with the mobile device is in proximity of the domain; and based on the user associated with the mobile device being in proximity of the domain, changing the communication with the user associated with the mobile device from the wide area communication to the local area communication. The local area communication may integrate local devices of the domain or augmented reality to communicate second information. The domain may be a house, business, or other objects (e.g., home-master bedroom-desktop lamp). The method, system, computer readable storage medium, or apparatus may provide for adjusting an environment of the house prior to allowing entry to the house, wherein the adjusting is based on the first information of the user. The environment may include lighting, temperature, music, ambient noise, access to rooms, etc. Ambient noise may be considered the background sounds which are present in a scene or location. Common ambient sounds include wind, water, birds, crowds, office noises, traffic, etc. All combinations in this paragraph (including the removal or addition of steps) are contemplated in a manner that is consistent with the other portions of the detailed description.

What is claimed:

1. An apparatus comprising:
    a processor; and a memory coupled with the processor, the memory storing executable instructions that when executed by the processor cause the processor to effectuate operations comprising:

obtaining first information of a user, wherein the user is associated with a mobile device, and wherein the first information comprises demographic information of the user associated with the mobile device;

based on the demographic information of the user associated with the mobile device, determining whether to communicate with the user associated with the mobile device via local area communication or wide area communication during a first period;

determining to communicate via the wide area communication during the first period;

based on an electronic calendar of the user associated with the mobile device, determining an availability of the user; and based on the determining to communicate via the wide area communication during the first period, sending an alert at a time of the availability to invite the user associated with the mobile device to communicate with a remote domain, the alert comprising an address and directions to a location of the remote domain.

2. The apparatus of claim 1, wherein the operations further comprise, based on acceptance of the invite, assigning a token for the user associated with the mobile device to further communicate with the remote domain.

3. The apparatus of claim 1, wherein the operations further comprise:

obtaining an indication that the user associated with the mobile device is proximate to the remote domain during a second period; and based on the user associated with the mobile device being proximate to the remote domain, changing communication with the user associated with the mobile device from the wide area communication to the local area communication.

4. The apparatus of claim 1, wherein the local area communication integrates local devices of the remote domain or augmented reality to communicate second information.

5. The apparatus of claim 1, wherein the remote domain comprises a house, wherein the operations further comprise adjusting an environment of the house prior to allowing entry to the house, and wherein the adjusting is based on the first information of the user associated with the mobile device.

6. The apparatus of claim 1, wherein the remote domain comprises a house, wherein the operations further comprise adjusting an environment of the house prior to allowing entry to the house, wherein the adjusting is based on the first information of the user associated with the mobile device, and wherein the environment comprises temperature.

7. The apparatus of claim 1, wherein the remote domain comprises a house, wherein the operations further comprise adjusting an environment of the house prior to allowing entry to the house, wherein the adjusting is based on the first information of the user associated with the mobile device, and wherein the environment comprises lighting.

8. A system comprising:

a mobile device; and an apparatus communicatively connected with the mobile device, the apparatus comprising:

a processor; and a memory coupled with the processor, the memory storing executable instructions that when executed by the processor cause the processor to effectuate operations comprising:

obtaining first information of a user, wherein the user is associated with the mobile device, and wherein the first information comprises a preference of the user associated with the mobile device;

based on the preference of the user associated with the mobile device, determining whether to communicate with the user associated with the mobile device via local area communication or wide area communication during a first period;

determining to communicate via the wide area communication during the first period;

based on an electronic calendar of the user associated with the mobile device, determining an availability of the user; and based on the determining to communicate via the wide area communication during the first period, sending an alert at a time of the availability to invite the user associated with the mobile device to communicate with a remote domain, the alert comprising an address and directions to a location of the remote domain.

9. The system of claim 8, wherein the operations further comprise:

obtaining an indication that the user associated with the mobile device is proximate to the remote domain during a second period; and based on the user associated with the mobile device being proximate to the remote domain, changing communication with the user associated with the mobile device from the wide area communication to the local area communication.

10. The system of claim 8, wherein the local area communication integrates local devices of the remote domain or augmented reality to communicate second information.

11. The system of claim 8, wherein the operations further comprise, based on acceptance of the invite, assigning a token for the user associated with the mobile device to further communicate with the remote domain.

12. The system of claim 8, wherein the remote domain comprises a house, wherein the operations further comprise adjusting an environment of the house prior to allowing entry to the house, and wherein the adjusting is based on the first information of the user associated with the mobile device.

13. The system of claim 8, wherein the remote domain comprises a house, wherein the operations further comprise adjusting an environment of the house prior to allowing entry to the house, wherein the adjusting is based on the first information of the user associated with the mobile device, and wherein the environment comprises temperature or lighting.

14. The system of claim 8, wherein the apparatus is a server local to the remote domain.

15. A non-transitory computer readable storage medium storing computer executable instructions that when executed by a computing device cause said computing device to effectuate operations comprising:

obtaining first information of a user, wherein the user is associated with a mobile device, and wherein the first information comprises mobile device usage information of the user associated with the mobile device;

based on the mobile device usage information of the user associated with the mobile device, determining whether to communicate with the user associated with the mobile device via local area communication or wide area communication during a first period;

determining to communicate via the wide area communication during the first period;

based on an electronic calendar of the user associated with the mobile device, determining an availability of the user;

based on the determining to communicate via the wide area communication during the first period, sending an alert at a time of the availability to invite the user associated with the mobile device to communicate with a remote domain, the remote domain comprising a house, and the alert comprising an address and directions to the house; and based on acceptance of the invite, assigning a token for the user associated with the mobile device to further communicate with the remote domain.

16. The non-transitory computer readable storage medium of claim 15, wherein the operations further comprise:

obtaining an indication that the user associated with the mobile device is proximate to the remote domain during a second period; and based on the user associated with the mobile device being proximate to the remote domain, changing communication with the user associated with the mobile device from the wide area communication to the local area communication.

17. The non-transitory computer readable storage medium of claim 15, wherein the local area communication integrates local devices of the remote domain to communicate second information.

18. The non-transitory computer readable storage medium of claim 15, wherein the local area communication integrates augmented reality to communicate second information.

19. The non-transitory computer readable storage medium of claim 15, wherein the operations further comprise adjusting an environment of the house prior to allowing entry to the house, wherein the adjusting is based on the first information of the user associated with the mobile device, and wherein the environment comprises ambient noise.

20. The non-transitory computer readable storage medium of claim 15, wherein the operations further comprise adjusting an environment of the house prior to allowing entry to the house, wherein the adjusting is based on the first information of the user associated with the mobile device, and wherein the environment comprises lighting.

* * * * *